US012770024B2

(12) United States Patent
Sun

(10) Patent No.: US 12,770,024 B2
(45) Date of Patent: Oct. 20, 2026

(54) SYSTEMS AND METHODS FOR MACHINE LEARNING MODEL SELECTION FOR TIME SERIES DATA

(71) Applicant: NetScout Systems, Inc., Westford, MA (US)

(72) Inventor: Quenie Sun, Dallas, TX (US)

(73) Assignee: NetScout Systems, Inc., Westford, MA (US)

( * ) Notice: Subject to any disclaimer, the term of this patent is extended or adjusted under 35 U.S.C. 154(b) by 818 days.

(21) Appl. No.: 18/172,520

(22) Filed: Feb. 22, 2023

(65) Prior Publication Data

US 2024/0265273 A1 Aug. 8, 2024

Related U.S. Application Data

(60) Provisional application No. 63/443,823, filed on Feb. 7, 2023.

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | | |
|---|---|---|---|---|
| 10,810,513 | B2 * | 10/2020 | Basel | G06F 16/285 |
| 2020/0151748 | A1 * | 5/2020 | Saha | G06Q 30/0202 |
| 2024/0177071 | A1 * | 5/2024 | Wang | G06N 3/0442 |

* cited by examiner

*Primary Examiner* — Alexey Shmatov
(74) *Attorney, Agent, or Firm* — Foley & Lardner LLP

(57) ABSTRACT

A method for machine learning model selection for time series data is disclosed. Sets of time series data is obtained. The time series data is clustered using a clustering algorithm. A similarity value of the clusters is evaluated and a quantity of clusters is selected. Machine learning models are evaluated using a center of each cluster of time series data. A machine learning model is selected for each cluster. Selection may be updated.

13 Claims, 6 Drawing Sheets

SYSTEMS AND METHODS FOR MACHINE LEARNING MODEL SELECTION FOR TIME SERIES DATA

CROSS-REFERENCE TO RELATED APPLICATIONS

This application claims the benefit of priority to U.S. Provisional Application No. 63/443,823, filed Feb. 7, 2023, the entirety of which is incorporated by reference herein.

BACKGROUND

A big data analytics platform may store data in table databases. Such table databases may include tables containing time, measurement, and dimension columns. Each measurement on a particular dimension, a combination of dimensions, or both, over a fixed time interval may be considered a time series. As part of the analytics platform, a monitoring system may monitor the databases for anomalies, and identify which measurement on which dimension at what time becomes anomalous.

Methods for detecting anomalies may include threshold-based and statistics-based methods. Threshold-based methods may utilize a manual trial and error process that may not adapt to data pattern changes. The threshold-based method may need to be re-adjusted only after either too many or too little anomalies are detected. Statistic-based methods may require a long history of data and may assume normal distribution. As such, the statistic-based method may not account for seasonality and may not apply effectively to time series data.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
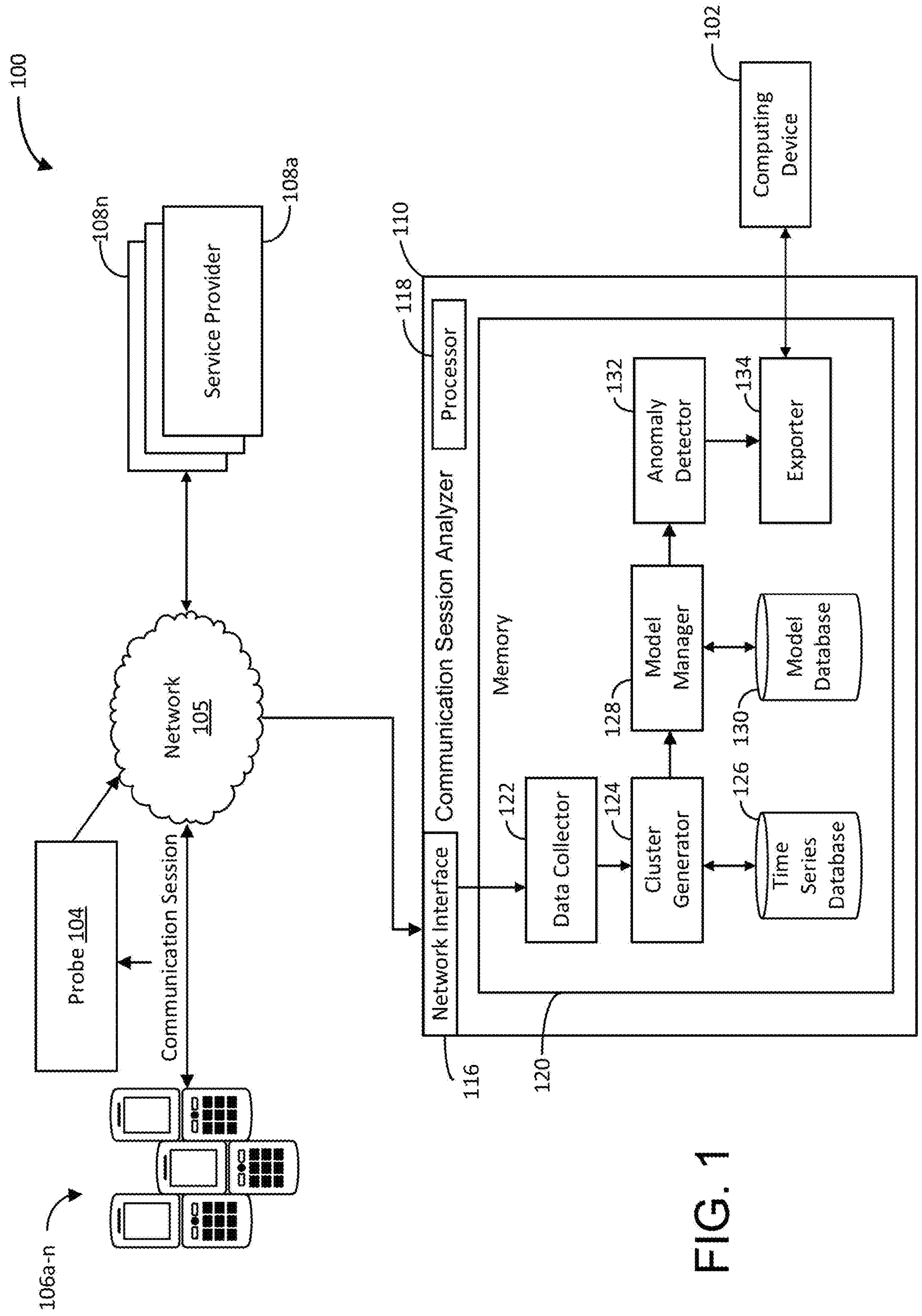
FIG. 1 is an illustration of a system for machine learning model selection for time series data, in accordance with an implementation.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A network monitoring system may have difficulties detecting anomalies associated with time series data. For example, the network monitoring system may implement a threshold-based or a statistic-based anomaly detecting method. The threshold-based method may utilize a manual trial and error process. Because of the manual nature of the method, determining the thresholds and identifying whether time series data is anomalous is highly time consumptive. Additionally, the method may not adapt to data pattern changes in an efficient manner and readjustment of the thresholds for detecting an anomaly may occur only after either too many or too few anomalies are detected. This may further result in an ineffective anomaly detecting method for large time series data.

The statistic-based method may also include various difficulties in detecting anomalies. One such difficulty may include the method requiring large amounts of historical data to calculate, for example, standard deviations, which may not always be available. In addition, the method may assume a normal distribution, which may not always apply to time series data. For example, time series data may include various attributes such as seasonality (e.g., a change in data frequency based on different months of the year, times of the day, etc.) that a normal distribution may not identify.

A computer implementing the systems and methods described herein may overcome the aforementioned technical deficiencies. For example, the computer may operate to select a machine learning model, among various machine learning models, for generating forecast data. The computer may also operate the selected machine learning model to generate thresholds (e.g., an upper bound and a lower bound) for determining anomalies in time series data. In some cases, the computer may group (e.g., cluster or generate a cluster) sets of time series data into clusters. The computer may do so based on similarities between the two or more sets of time series data within each cluster. The computer may then evaluate different machine learning models for each of the generated clusters using a center of the time series data of each cluster. The computer may select the machine learning model with an output that satisfies an accuracy threshold (e.g., maximum or minimum data prediction variance).

To generate the clusters, the computer may apply one or more clustering algorithms. For example, the computer may use a first clustering algorithm (e.g., a K-means algorithm) to cluster the time series data sets into a first quantity (e.g., defined quantity) of clusters. The computer can calculate a similarity value between each of the sets of time series data. If a similarity value for the clusters is below a threshold, then the computer can use the first clustering algorithm to cluster the time series data into an increased (e.g., incremented) quantity (e.g., number) of clusters compared with the first quantity of clusters. The computer can repeat this process until either calculating a similarity value for the clusters that exceeds the threshold or determining the quantity of clusters has reached or exceeded a threshold (e.g., a cluster threshold). Responsive to determining the quantity of clusters has reached or exceeded the threshold, the computer may reset the quantity of clusters to the initial defined quantity (or another defined quantity) and repeat the process using a second clustering algorithm (e.g., a Gaussian Mixture Model (GMM)). Responsive to identifying a set of clusters with a similarity value using the first clustering algorithm or the second clustering algorithm, the computer can identify and retrieve time series data from the centers of the clusters to generate data points to use to evaluate machine learning models.

To evaluate the different machine learning models, the computer may execute various machine learning models using portions of known data as input. For example, a list of machine learning models may be ordered based on model training efficiency to reduce the processing requirements and training time that is required to train the machine learning models during the process. The computer may execute each machine learning model in the order of the list using a first portion of time series data identified from the centers of the clusters, as described above, to generate predicted values of time series data. Based on the predicted values and a second portion of time series data (e.g., known values), the computer may calculate a variance associated with the machine learning model. If the variance is below the threshold, the computer may evaluate the next machine learning model in the list. If the variance satisfies a threshold, the computer may select the associated machine learning model, generate thresholds for determining anomalies, and generate predicted values for a next period of time series data.

The techniques described herein may result in various advantages over the aforementioned technical deficiencies. For example, adopting the machine learning selection process described herein for time series data may allow for reduced manual configuration (e.g., no manual configuration) of thresholds for anomaly detection, increased adaptability and accuracy of predictions (e.g., forecasts) by accounting for time series data attributes (e.g., seasonality, trending), improved alerting capabilities and network planning, among other advantages.

FIG. 1 illustrates an example system 100 for machine learning model selection for time series data, in accordance with an implementation. The system 100 may provide improved anomaly detection for time series data in a network monitoring system. In brief overview, the system 100 may include a probe 104 that receives and/or stores data packets transmitted via a network 105 between client devices 106*a-n* (hereinafter client device 106 or client devices 106) and service providers 108*a-n* (hereinafter service provider 108 or service providers 108). The service providers 108 can each include a set of one or more servers 402, depicted in FIG. 4A, or a data center 408. System 100 can also include a communication session analyzer 110 that can communicate or interface with the probe 104 and/or a computing device 102, either directly or via the network 105, to obtain sets of time series data regarding communication sessions between client devices 106 and service providers 108. Communication session analyzer 110 can collect data from the probe 104 and select (update, evaluate) a machine learning model to generate thresholds for determining anomalies in the sets of time series data, generate predicted values for a next period of time series data, or both. Communication session analyzer 110 can communicate the generated thresholds, detected anomalies, the selected machine learning model, or any combination thereof to the computing device 102 and/or the service providers 108.

The probe 104, the client devices 106, the service providers 108, the computing device 102, and/or the communication session analyzer 110 can include or execute on one or more processors or computing devices (e.g., the computing device 403 depicted in FIG. 4C) and/or communicate via the network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions provided by service providers 108 or otherwise communicate with the servers of the service providers 108 for data. In some embodiments, network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the probe 104, the client devices 106, the service providers 108, the computing device 102, and/or the communication session analyzer 110 can include or utilize at least one processing unit or other logic device such as programmable logic array engine, or module configured to communicate with one another or other resources or databases. The components of the probe 104, the client devices 106, the service providers 108, the computing device 102, and/or the communication session analyzer 110 can be separate components or a single component. System 100 and its components can include hardware elements, such as one or more processors, logic devices, or circuits.

Still referring to FIG. 1, and in further detail, system 100 can include the service providers 108. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network, and is also referred to as a communications network service. Examples of services include 5G broadband services, any voice, data or video service provided over a network, smart-grid network, digital telephone service, cellular service, Internet protocol television (IPTV), etc.

Client devices 106 can include or execute applications to receive data from the service providers 108. For example, a client device 106 may execute a video application upon receiving a user input selection that causes the client device 106 to open the video application on the display. Responsive to executing the video application, a service provider 108 associated with the video application may stream a requested video to the client device 106 in a communication session. In another example, a client device 106 may execute a video game application. Responsive to executing the video game application, a service provider 108 associated with the video game application may provide data for the video game application to the client device 106. The client devices 106 may establish communication sessions with the service providers 108 for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 410 depicted in FIG. 4B). If the client device 106 is deployed in a cloud 410, the client device 106 can include or be referred to as a virtual client device or virtual machine. In the event the client device 106 is deployed in a cloud 410, the packets exchanged between the client device 106 and the service providers 108 can still be retrieved by probe 104 from the network 105. The computing device 102 may be similar to client devices 106. In some cases, the probe 104, the client devices 106, and/or the communication session analyzer 110 can be deployed in the cloud 410 on the same computing host in an infrastructure 416 (described below with respect to FIG. 4B).

As service providers 108 provide or transmit data in communication sessions to client devices 106, the probe 104 may intercept or otherwise monitor the control plane signaling data (e.g., control plane signaling data packets) of the communication sessions. The probe 104 may comprise one or more processors that are connected to a network equipment manufacture (NEM) trace port of network 105. In some embodiments, the probe 104 may collect control plane signaling data at an Evolved Packet Core interface (e.g., the S1-MME interface or the S6a interface) of the network 105. The control plane signaling data may include geographical location data (e.g., cell tower triangulation data or global positioning system data) of the client devices 106 as client devices 106 receive data and/or transmit, a cell identifier identifying the cell in which the respective client device 106 was located while transmitting or receiving the data, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc. The probe 104 may receive such data and forward the data to the communication session analyzer 110 over the network 105 for further processing.

Communication session analyzer 110 may comprise one or more processors that are configured to obtain time series data, select a machine learning model for groups of the time series data, and calculate thresholds for detecting anomalies. The communication session analyzer 110 may comprise a network interface 116, a processor 118, and/or memory 120. Communication session analyzer 110 may communicate with any of the computing device 102, the probe 104, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

Memory 120 may include a data collector 122, a cluster generator 124, a time series database 126, a model manager 128, a model database 130, an anomaly detector 132, and an exporter 134, in some embodiments. In brief overview, the components 122-134 may generate clusters of time series data using one or more clustering algorithms. The components 122-134 may evaluate various machine learning models on a center time series data set of each cluster to select a machine learning model per cluster based on an associated variance value satisfying an accuracy threshold. The components 122-134 may use the selected machine learning model to generate upper and lower bounds for detecting time series data anomalies (e.g., anomaly detection thresholds) and forecast (e.g., predict, generate, calculate) next time series data (e.g., sets of time series data subsequent to the clustered time series data sets). In some cases, the components 122-134 may communicate the anomaly detection thresholds, detected anomalies, an indication of the selected machine learning model, or any combination thereof, to the computing device 102. In some embodiments, the components 122-134 may periodically (e.g., at set periods, intermittently, upon a trigger) update the machine learning model selections and determine whether to select another machine learning model or maintain the same selection.

The data collector 122 may comprise programmable instructions that, upon execution, cause the processor 118 to obtain (e.g., receive, collect) sets of time series data. For example, the data collector 122 may obtain the sets of time series data from polling the probe 104 and/or one or more databases of the network 105. In some cases, the sets of time series data may be data over a fixed time interval. For example, a database (e.g., relational, non-relational, object oriented) of the network 105 may include multiple types of data (e.g., time, measurement, dimension). A first set of time series data may include each measurement of a first dimension over a fixed time interval. Upon obtaining the sets of time series data, the data collector 122 may transfer the data to the cluster generator 124.

The cluster generator 124 may comprise programmable instructions that, upon execution, cause the processor 118 to cluster the sets of time series data. In some examples, a cluster of time series data sets may include a group of at least two sets of time series data. The quantity of sets per cluster may depend on a quantity (e.g., number) of total sets of time series data being clustered and a cluster quantity parameter. For example, if the total quantity of sets is twelve and the cluster quantity parameter is two, the cluster generator 124 may group the sets of time series data into two clusters of six sets each. To do so, the cluster generator 124 may use one or more clustering algorithms.

In some implementations, the cluster generator 124 may be configured to cause the processor 118 to execute a first clustering algorithm. For example, the first clustering algorithm (e.g., K-Means, Gaussian Mixture Models (GMM), etc.) may be designed to group sets of time series data with similar characteristics (e.g., measurements, dimensions, duration, etc.) into a predefined quantity of clusters. The cluster generator 124 may cause the processor 118 to calculate (e.g., compute) a similarity value (e.g., silhouette score). For example, the processor may calculate how similar characteristics of each set of time series data within a cluster are to each other and how dissimilar those characteristics are to other clusters. The cluster 118 may utilize a silhouette coefficient equation (e.g., including mean intra-cluster distance and mean nearest-cluster distance). If the similarity value satisfies a threshold (e.g., a preconfigured threshold indicating the similarities between the sets within each cluster is satisfactory) the cluster generator 124 may determine a center (e.g., calculate an arithmetic mean, calculate which set of time series data is closest to each other set within a cluster) of time series data for each cluster.

In some cases, the cluster generator 124 may repeat this process while incrementing the cluster quantity parameter. If the similarity value does not satisfy the threshold (e.g., is below the threshold) and the cluster quantity parameter does not satisfy a second threshold (e.g., is below a preconfigured quantity), the cluster generator 124 may increase (e.g., increment by an integer value) the cluster quantity parameter and cause the processor 118 to apply the first clustering algorithm to generate more clusters. If applied in the previous example, the cluster generator 124 may group the sets of time series data into three clusters of four sets each.

In some cases, the cluster generator 124 may be configured to cause the processor 118 to execute a second clustering algorithm. For example, if the similarity value is below the threshold and the cluster quantity parameter satisfies the second threshold, then the processor 118 may reset the cluster quantity parameter and apply a second clustering algorithm (e.g., K-Means, Gaussian Mixture Models (GMM), etc.). The cluster generator 124 may utilize a similar process (e.g., same) as for the first clustering algorithm to generate multiple clusters and determine if respective similarity values satisfy the threshold. If the respective similarity values fail to satisfy the threshold once the cluster quantity parameter satisfies the second threshold, the cluster generator may compare the similarity values and select the cluster results with the highest similarity value.

The cluster generator 124 may store the clusters (e.g., groupings) of sets of time series data (e.g., an indication of the clusters) in memory (e.g., the memory 120). In some embodiments, the cluster generator 124 may store the clusters in the time series database 126. The time series database 126 (e.g., a time series catalog) may be a database (e.g., relational, non-relational, object oriented) that stores the clusters of the time series data, an indication of the clusters, the center for each cluster, and/or the similarity values of each cluster, among other potential data. In some cases, the cluster generator 124 may store such data from multiple communication sessions between different nodes with identifiers to distinguish between the communication sessions. In some examples, the cluster generator 124 may store the data in memory instead of the time series database 126. The cluster generator 124, the processor 118, and/or another component of the memory 120 may retrieve data from the time series database 126 to generate further clusters, determine the highest similarity value, and/or to determine a center for each cluster, among other uses.

In some embodiments, the model manager 128 may comprise programmable instructions that, upon execution, cause the processor 118 to organize (e.g., order, generate) a list of machine learning models. The list of machine learning models may include various types of machine learning models associated with respective metrics. The model manager 128 may order the machine learning models by the respective metrics. For example, a metric may be a model training efficiency, where the model manager 128 may place a more efficient machine learning model before a less efficient machine learning model. While any quantity of machine learning models and types of machine learning models may be listed, some examples may include, in some cases in sequential order for evaluating based on efficiency, Holt-Winters, XGBoost, Autoregressive Integrated Moving Average (ARIMA), NeuralProphet, Gluon, Greykite, and Long Short-term Memory Network (LSTM).

The model manager 128 may comprise programmable instructions that, upon execution, cause the processor 118 to evaluate a first machine learning model of the list of machine learning models. The processor 118 may evaluate the first machine learning model using a center (e.g., a set of time series data identified as the center) of a cluster as input. In some embodiments, the model manager 128 may use a portion of the set of time series data as input. The portion may be a first portion that includes time data prior to a second portion of the time series data. An output of the first machine learning model may be predicted values (e.g., predicted time series data) that include time data associated with the second portion of the time series data. The model manager 128 may compare the predicted values to the second portion and calculate a variance score (e.g., R2 score) based on differences between the predicted values and the second portion. If the variance score satisfies a variance threshold, the model manager 128 may skip evaluation of the other machine learning models of the list and select the first machine learning model.

In some embodiments, the model manager 128 may evaluate the other machine learning models of the list. For example, the variance score of the first machine learning model may not satisfy the variance threshold. The model manager 128 may then evaluate a second machine learning model and generate a second variance score. This process may be repeated until the list has been exhausted or a satisfactory variance score has been calculated. In one example of the list being exhausted, the model manager 128 may compare the respective variance scores of each machine learning model and select the variance score with the least variance. In a second example of the list being exhausted, the model manager 128 may use standardization (e.g., z-score) to generate the predictions (e.g., rather than the machine learning models). In some implementations, the model manager 128 may repeat the evaluation process per cluster of time series data sets (e.g., using the respective centers for each cluster as input).

In some implementations, the model manager 128 may cause the processor 118 (e.g., multiple processors 118) to evaluate two or more of the machine learning models in parallel (e.g., in tandem, at the same time). For example, the model manager 128 may support horizontal scalability such that the machine learning functions of the evaluation process may be executed in parallel across multiple cores of the network 105 (e.g., multiple processors 118 executing the machine learning models at the same time). In one example, one core (e.g., one runner instance) can perform machine learning tasks (e.g., determine one or more metrics using a machine learning model of the core) on one cluster only. Multiple cores can perform machine learning tasks individual cores at the same time, thus enabling parallel processing of time series data. Multiple clusters may be generated, evaluated, updated, or any combination thereof, in parallel. Thus, multiple metrics may be processed at once, including multiple clusters per metric. To do so, the model manager 128 may store in the model database 130 identification for each cluster (e.g., a cluster index). Using multiple cores to process the data of different clusters can enable independent and potentially concurrent processing of each cluster.

The model manager 128 may cause the processor 118 to execute the selected machine learning model to generate forecast data for another period of time (e.g., using the first portion, the second portion, other data, or any combination thereof, as input). The period of time can be a period subsequent to the first portion and the second portion of time series data or another period of time (e.g., before, including, after, or any combination thereof). In some cases, the model manager 128 may generate forecast data for each time series data set in the cluster. The model manager 128 may calculate respective variance scores for each set in the cluster and an average variance score for each metric. For example, the clusters may be associated with a metric (e.g., a measurement, a dimension, etc.) common to all time series data sets in each cluster. The model manager 128 may average the variance scores of each time series data sets across the clusters and compare the average to a variance threshold associated with the clusters. In some cases, the model manager 128 may reevaluate and reselect a machine learning model for each cluster associated with the metric based on determining that the average is below the threshold, is below the threshold a quantity of consecutive instances, is below the threshold a quantity of non-consecutive instances, or any combination thereof. For example, data patterns associated with the metric may change over time. By continuously forecasting data and evaluating variance scores related to the forecasted data, the model manager 128 may adapt the machine learning models (e.g., the selection of machine learning models) to the changes in data patterns. In some embodiments, the model manager 128 may determine to perform the machine learning evaluation process based on an average variance score for each cluster or for each set of time series data.

In some examples, the model manager 128 may cause the processor 118 to calculate thresholds associated with anomaly detection based on the evaluation of the selected machine learning model. For example, the model manager 128 may calculate an upper bound and a lower bound for non-anomalous time series data based on the variance scores for each cluster. The model manager 128 may indicate the thresholds to the anomaly detector 132.

The model manager 128 may store an indication of a selected machine learning model for each cluster, anomaly detection thresholds for each cluster, and/or a quantity of averages below the variance threshold, among other data, in memory (e.g., the memory 120). In some embodiments, the model manager 128 may store such data in the model database 130 (e.g., a model repository, a relational database, a non-relational database, an object oriented database). In some cases, the model manager 128 may store such data from multiple communication sessions between different nodes with identifiers to distinguish between the communication sessions. In some examples, the model manager 128 may store the data in memory instead of the model database 130. The model manager 128, the processor 118, and/or another component of the memory 120 may retrieve data from the model database 130 to generate anomaly thresholds, to generate forecast data, and/or to trigger reevaluation of machine learning models, among other uses.

The anomaly detector 132 may comprise programmable instructions that, upon execution, cause the processor 118 to detect anomalies in the sets of time series data. The anomaly detector 132 may compare the sets of time series data to the respective anomaly thresholds (e.g., the upper and lower bounds) and determine if any of the time series data satisfies the thresholds. For example, the anomaly detector 132 may determine that a set of time series data is greater than the upper bound. Alternatively, the anomaly detector 132 may determine that the set of time series data is less than the lower bound. In either case, the anomaly detector 132 may detect that the set of time series data is anomalous. In some implementations, the anomaly detector 132 may flag the anomalous data (e.g., store an indication of anomaly with identification in the memory 120) and indicate the anomaly to the exporter 134.

The exporter 134 may comprise executable instructions that, upon execution by the processor 118, may export the generated anomaly detection thresholds, indications of which sets of time series data are anomalous, indications of the selected machine learning models, predictions for the next sets of time series data, or any combination thereof (e.g., generated data), to the computing device 102. For example, the exporter 134 may create an exportable file (e.g., a file with a format such as BIL, GRD/TAB, PNG, ASKII, KMZ, etc.) from the generated data and transmit the exportable file to the computing device 102 for display. The exporter 134 may transmit the exportable file to the computing device 102 responsive to a request from the computing device 102. In some embodiments, the exporter 136 may generate and/or export exportable files to the computing device 102 at set intervals to provide the computing device 102 with real-time updates of the performance of communication sessions between nodes.

Figure 2:
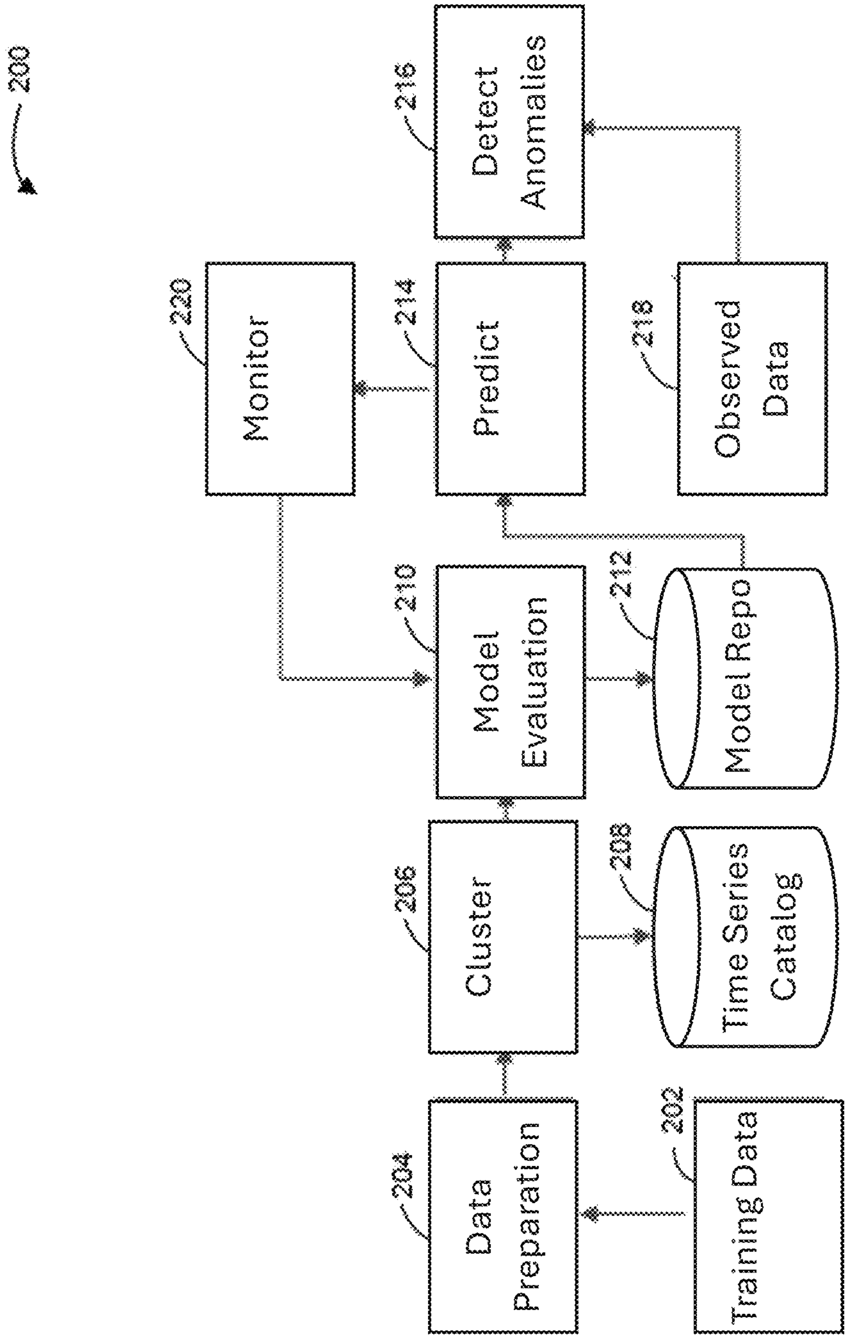
FIG. 2 is a flow diagram of a process for machine learning model selection for time series data, in accordance with an implementation

FIG. 2 illustrates a flow diagram of a process 200 for machine learning model selection for time series data, in accordance with an implementation. The process 200 may be performed by a data processing system (a client device, a probe, the communication session analyzer 110, shown and described with reference to FIG. 1, a server system, etc.). The process 200 may include more or fewer operations and the operations may be performed in any order.

At operation 202, the data processing system may pull data from a database. A probe (e.g., probe 104) may collect data packets or copies of data packets transmitted between nodes (e.g., two nodes) of a communication session. A network (e.g., network 105) may store the data packets of the communication session in memory (e.g., memory 120). The data may be stored in tables containing time, measurement, and dimension columns. The data processing system may pull data associated with each measurement of a dimension over a fixed time interval (e.g., time series data) from the network.

In some cases, the data collected from the probe may be training data. In one example, the data can be combined to form separate feature vectors. The data processing system or a human can label the feature vectors with a ground truth value for a metric. The feature vectors can be fed into the machine learning models to train the machine learning models using supervised and/or unsupervised training techniques. For instance, to train a neural network, the data processing system can train the neural network using a loss function and back-propagation techniques with the labeled feature vectors.

At operation 204, the data processing system may prepare the time series data. The data processing system may separate the time series data into two different portions. A first portion may include test data to be used as input for evaluating various machine learning models. A second portion may include known data to be used to calculate a variance score to evaluate how similar the output of each machine learning model is to the known data.

At operation 206, the data processing system may perform a clustering operation. For example, evaluating the machine learning models with each time series data set of the first portion of data as input may be resource intensive (e.g., cost time, power, computational ability, etc.). By grouping the time series data with similar characteristics into a cluster, a center of the cluster may be evaluated on behalf of the entire cluster (e.g., the center may represent, with a level of confidence, the other time series of the cluster).

The data processing system may group the first portion of test data by using an automatic clustering algorithm (e.g., K-Means, GMM). The data processing system may set a quantity of clusters parameter to a predetermined quantity (e.g., two, any integer value). The data processing system may apply (e.g., run, process, perform) the clustering algorithm with the first portion as input. The clustering algorithm may group the time series data sets into a quantity of clusters equal to the quantity of clusters parameter and compute a silhouette score that is based on a distance between each time series within a cluster and each time series of another cluster (e.g., a silhouette score of 1 may indicate that clusters are dissimilar and a score of −1 may indicate that clusters are similar to each other). The data processing system may perform Boolean logic. If the silhouette score is satisfactory (e.g., equal to or greater than a quantity or threshold), then exit the clustering algorithm process. If the silhouette score is not satisfactory and the quantity of clusters is less than or equal to a cluster threshold (e.g., ten clusters, a predetermined integer value), then increase the quantity of clusters parameter and reapply the clustering algorithm to generate more clusters. If the silhouette score is not satisfactory and the quantity of clusters is greater than the cluster threshold, reset the quantity of clusters parameter and apply another clustering algorithm different from the previous clustering algorithm. The data processing system may continue this cycle (e.g., using clustering algorithms to generate clusters and silhouette scores) until a quantity of clustering algorithms have been used (e.g., both the K-Means and GMM algorithms) or a satisfactory silhouette score has been computed. If no satisfactory silhouette score is computed, the data processing system may select the cluster results that produced the highest silhouette score.

Additionally, at operation 206, the data processing system may calculate a center of each cluster. The data processing system may determine which time series data set is the cluster center. To do so, the data processing system may compare each time series data set to each other time series data set of the cluster. The cluster center may be the time series data set that is closest (e.g., is most similar) to each other time series data set in the cluster.

In some implementations, the data processing system may store the clusters, indications of the clusters, each silhouette score, a portion of the silhouette scores, each center of every cluster, any combination thereof, among other data, in a database 208 (e.g., a time series catalog). The data processing system may access data stored in the database 208, for example, as input to a machine learning model or to compare which silhouette score associated with a cluster center was the highest score, among other uses.

At operation 210, the data processing system may evaluate machine learning models. In some examples, for time series data, a single machine learning model may be insufficient for all time series data. For example, a first machine learning model may forecast (e.g., predict) subsequent time series data more accurately than a second machine learning model for a first set of time series data, yet forecast with less accuracy than the second machine learning model for a second set of time series data. Thus, the data processing system may evaluate different machine learning models for each cluster of time series data and select the machine learning model that generates the most accurate forecast for that cluster. To reduce the cost of evaluating and selecting the machine learning models, the data processing system may use the center of each cluster for input as proxy for the entire cluster.

Additionally, the data processing system may evaluate each machine learning model in order. For example, the data processing system may access a list of preordered machine learning models or generate the list. The list may be ordered based on how efficient the model is (e.g., each model may be ranked on efficiency of execution, latency to produce an output), such that the data processing system may evaluate more efficient models before less efficient models.

In some cases, the data processing system may evaluate only a portion of the list. For example, at the end of evaluation (e.g., once the machine learning model has processed the input and produced an output), the data processing system may calculate a variance score (e.g., R2 score) based on the output (e.g., the predicted values) and the second portion of data (e.g., the known test data). The data processing system may determine the variance score by comparing the output to the second portion of data and finding differences between the two. If the variance score satisfies (e.g., exceeds) a variance threshold, then the data processing system may skip the less efficient models and select the model associated with the satisfactory variance score. Otherwise, the data processing system may continue down the list. If no model can achieve a satisfactory variance score, a z-score may be used to generate predictions based on the center of each cluster. While evaluating each model, the data processing system may tune (e.g., update) various hyper-parameters (e.g., determine a set of more optimal parameter values for each machine learning model, compared to the originally used parameter values, while evaluating the model).

The data processing system may communicate (e.g., store, pull) with a database 212 (e.g., model repository) to facilitate the evaluation process. The data processing system may store the output of each evaluation, each variance score, the hyper-parameters, z-score predictions, the variance threshold, or any combination thereof, among other data, in the database 212.

Once a machine learning model is selected for a cluster, at operation 214, the data processing system may execute the selected machine learning model using each time series of the cluster as input (e.g., rather than just the center). The machine learning model may output a prediction (e.g., what each measurement may be a period of time after the respective time series) for each time series data set. The data processing system may evaluate the predictions and calculate an upper and lower bounds for anomalies associated with the cluster. For example, the data processing system may determine the upper bound to be a quantity of standard deviations greater than a mean of the predictions and the lower bound to be a quantity of standard deviations less than the mean.

In some embodiments, before evaluating a machine learning model, the data processing system can train the machine learning model. For instance, the data processing system can evaluate the different types of machine learning models sequentially, only evaluating the next machine learning model of the sequence (e.g., the sequence based on the efficiency of training and/or executing the machine learning models) responsive to determining the variance score for the prior machine learning model of the sequence does not satisfy the variance threshold. The data processing system can train the machine learning models immediately prior to evaluating the machine learning models. For example, each machine learning model may be untrained (e.g., have a set of predetermined weights or parameters). The data processing system can train a first machine learning model of the sequence and evaluate the first machine learning model. Responsive to determining the variance score of the first machine learning model does not satisfy the variance threshold, the data processing system can then train a second machine learning model of the sequence (e.g., the next most efficient machine learning model of the sequence). The data processing system can repeat this process for each of the machine learning models of the sequence.

At operation 216, the data processing system may detect anomalies. The data processing system may receive observed data 218 (e.g., observed time series data) from the network, the probe, or another component of a system (e.g., system 100) and compare the received time series data to an appropriate upper and lower bounds (e.g., a corresponding threshold based on a metric of the time series data being similar to the threshold). If the time series data is outside of the upper or lower bounds, the data processing system may identify that the time series data is anomalous.

At operation 220, the data processing system may monitor the predictions. For example, the data processing system may update the machine learning model selections. The data processing system may calculate accumulative variance scores for each time series prediction using the selected machine learning model and calculate an average variance score across time series data associated with a metric. If the average variance falls below a threshold for a consecutive quantity of times (e.g., for N number of times), the data processing system may reevaluate and reselect a machine learning model for that metric (e.g., for all clusters associated with the metric). Thus, the machine learning model selection may adapt with data pattern changes in the time series data over time.

Figure 3:
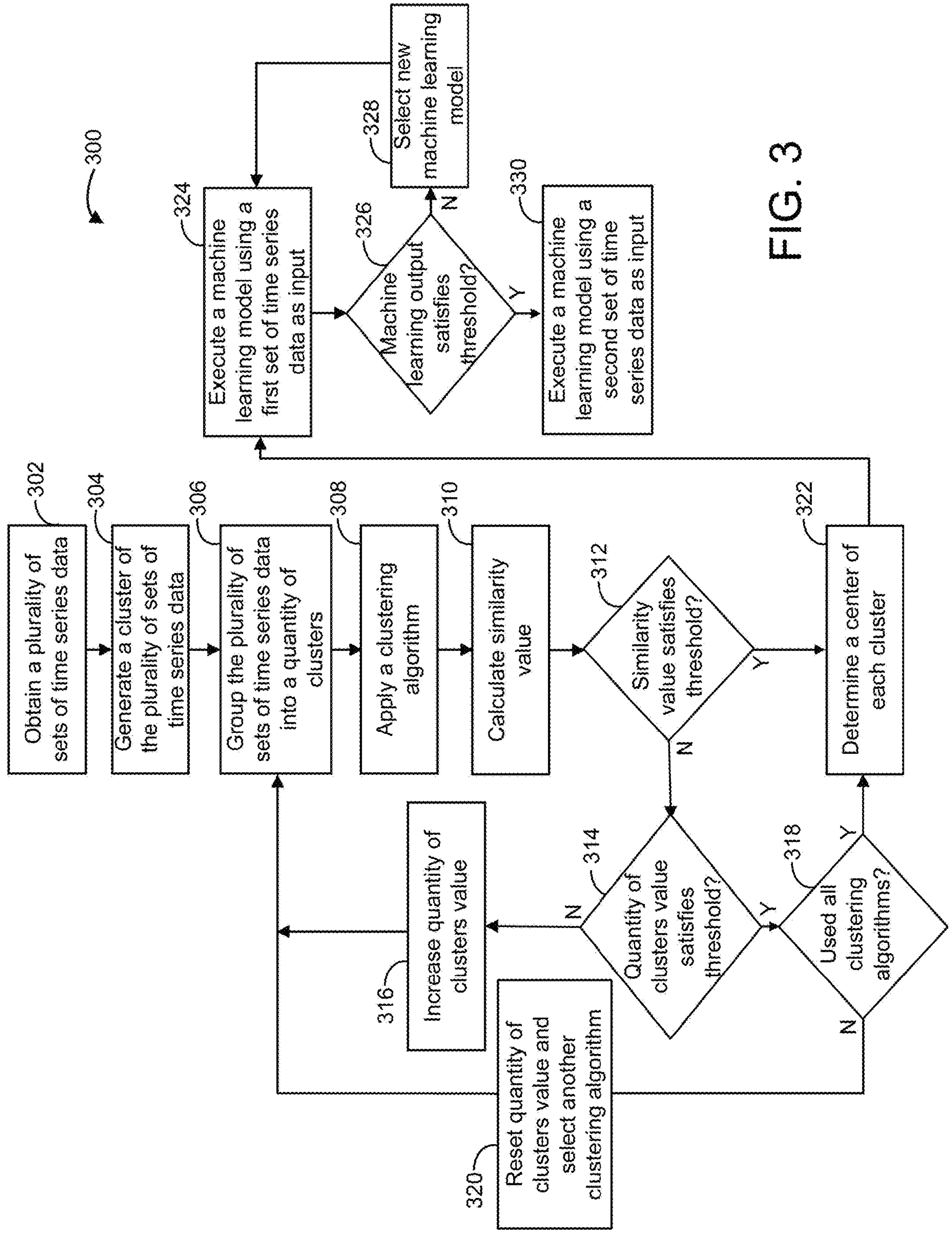
FIG. 3 is a method for machine learning model selection for time series data, in accordance with an implementation.

FIG. 3 illustrates a method 300 for machine learning model selection for time series data, in accordance with an implementation. The method 300 may be performed by a data processing system (a client device, a probe, the communication analyzer 110, shown and described with reference to FIG. 1, a server system, etc.). The method 300 may include more or fewer operations and the operations may be performed in any order. Performance of the method 300 may enable the data processing system to use a machine learning model to predict future time series data, establish upper and lower bounds of non-anomalous time series data, and detect anomalous time series data. Such prediction and threshold generation may result in a high resource cost and have differing accuracies for each time series data set based on a type of machine learning model used. To reduce the cost and increase the accuracy of the prediction, the data processing system may group multiple sets of time series data into clusters and determine a center of each cluster. The data processing system may use the center as input to multiple machine learning models and select a machine learning model with a variance score that satisfies a threshold. The data processing system may update the selection if a quantity of variance scores consecutively fall below the threshold.

At operation 302, the data processing system may obtain multiple sets of time series data. The data processing system may receive the sets from memory, a probe, a network, or other component (e.g., memory 120, probe 104, network 105). The sets may be historical data stored in a database.

At operation 304, the data processing system may generate a cluster. The cluster may include two or more of the multiple sets of time series data. The data processing system may generate the cluster based on a similarity between each of the two or more sets of time series data. At operation 306, the data processing system may group the sets into multiple clusters. The data processing system may group the sets into a first quantity of clusters associated with a quantity of clusters parameter by applying, at operation 308, a first clustering algorithm to the multiple sets of time series data. In some implementations, the data processing system may group each portion of the multiple sets of time series data associated with a respective metric into a quantity of clusters (e.g., a quantity similar to the quantity of clusters parameter). For example, the sets may be associated with multiple metrics (e.g., measurements, dimensions, etc.). The data processing system may separate the time series data sets by metric and perform the clustering algorithm per metric group.

At operation 310, the data processing system may calculate a similarity value between each of the sets of time series data. The data processing system may calculate a similarity value for each time series data set of a cluster (e.g., intra-cluster). The similarity value may indicate how similar the time series data set is to each other time series data set of the cluster (e.g., a distance from one set to another).

At operation 312, the data processing system may determine if the similarity value satisfies a threshold (e.g., a second threshold). The data processing system may do so by comparing the similarity value to the threshold. If the similarity value is greater than the threshold, then the data processing system may continue to operation 322. If the similarity value is less than the threshold, then the data processing system may continue to operation 314. While greater than, less than, and equal to, operations are used herein as examples of satisfying a threshold, other means or combinations of operations may also be used.

At operation 314, the data processing system may determine if the quantity of clusters value (e.g., parameter) satisfies a threshold (e.g., a third threshold). If the quantity of clusters is greater than the threshold, the data processing system may continue to operation 318. If the similarity value is less than the threshold, the data processing system may continue to operation 316.

At operation 316, the data processing system may increase (e.g., increment by an integer value) the quantity of clusters parameter. Responsive to determining the similarity value between each of the multiple sets of time series data is below the second threshold, the data processing system may return to operation 306 and group the multiple sets of time series data into a second quantity of clusters greater than the first quantity of clusters, in accordance with the increase quantity of clusters parameter.

At operation 318, the data processing system may determine if all of the clustering algorithms have been used. For example, the data processing system may be configured with a list of clustering algorithms. The data processing system may compare the used clustering algorithm to the list of clustering algorithms. If there is an unused clustering algorithm in the list, the data processing system may continue to operation 320. If all of the clustering algorithms in the list have been used, the data processing system may continue to operation 322.

At operation 320, the data processing system may reset the quantity of clusters value and select another clustering algorithm from the list of clustering algorithms that is unused. Responsive to determining the similarity value between each of the plurality of sets of time series data is below the second threshold and the first quantity of clusters satisfies the third threshold, the data processing system may process the multiple sets of time series data into the first quantity of clusters (e.g., in accordance with the reset quantity of clusters value) by applying a second clustering algorithm (e.g., from the list of clustering algorithms) to the multiple sets of time series data. The data processing system may continue to operation 306 and group the multiple sets of time series data according to the reset quantity of clusters value and the second clustering algorithm.

At operation 322, the data processing system may determine a first set of time series data as a center of the cluster. For each cluster generated by the clustering algorithm, the data processing system may determine a respective center. In some cases, the center may be a time series data set that is closest to each other time series data set in the cluster, is most similar to each other time series data set in the cluster, among other forms of determination.

At operation 324, the data processing system may execute a first machine learning model using the first set of time series data (e.g., the center) as input to generate a first time series output. In some implementations, the data processing system may execute machine learning models for a portion of the centers or all of the centers in parallel. In some examples, executing the first machine learning model includes setting one or more hyper-parameters associated with the first machine learning model. For example, the hyper-parameters may be parameters used by the first machine learning model to calculate the output. The hyper-parameters may be tuned to increase the efficiency of the machine learning model, the accuracy of the output, or both, among other benefits.

At operation 326, the data processing system may determine if the machine learning output satisfies a threshold (e.g., a first threshold). The data processing system may do so by comparing the output of the machine learning model to known values (e.g., test data) associated with the output. For example, the first set of time series data may correspond to a first portion of test data. The output of the machine learning model may be predictions of second time series data after the first set of time series data. The data processing system may compare the predictions to a second portion of test data (e.g., data after the first portion) and calculate a variance score based on the comparison. If the variance score is below the first threshold, the data processing system may continue to operation 328. If the variance score is above the first threshold, the data processing system may continue to operation 330.

At operation 328, the data processing system may select another machine learning model. The data processing system may be configured with a list of machine learning models. In some cases, prior to determining the first time series output satisfies the threshold, the data processing system may execute, at operation 324, one or more other machine learning models (e.g., of the list of machine learning models) using the first set of time series data as input to generate respective time series output. For example, the data processing system may determine that the respective time series output is below the threshold at operation 326. The data processing system may move down the list of machine learning models and, at operation 328, select the next machine learning model on the list. In some implementations, the list including the one or more other machine learning models and the first machine learning model is ordered based on an efficiency metric (e.g., how efficient the machine learning models are in producing an output).

In some cases, the data processing system may exhaust (e.g., execute all of) the list of machine learning models. If the data processing system uses all of the machine learning models without determining a variance score above the first threshold, the data processing system may use a z-score to determine the predicted time series data sets.

Responsive to determining the first time series data output of the first machine learning model satisfies the threshold, at operation 330, the data processing system may execute the first machine learning model using a second set of time series data as input to generate a second time series output. For example, the data processing system may select the first machine learning model for the cluster based on the output satisfying the threshold. The data processing system may apply the first machine learning model to the other time series data sets within the cluster (e.g., the time series data sets excluding the center). The data processing system may determine upper and lower bounds based on the output of the first machine learning model for the cluster. Any time series data sets (e.g., predictions) outside of the bounds may be anomalous.

In some cases, data patterns associated with the time series data sets may change over time. Due to the change in data patterns, continued output of the first machine learning model (e.g., the selected machine learning model) may produce a higher variance value than previous output. Responsive to determining the second time series output of the first machine learning model is below the threshold (e.g., the first threshold), the data processing system may execute a second machine learning model (e.g., from the list of machine learning models) using the first set of time series data as input to generate a third time series output. In some cases, the data processing system may execute the second machine learning model using another set of time series data after the first set of time series data. In some examples, executing the second machine learning model may be part of a reevaluation process similar to repeating operation 324.

Figure 4A:
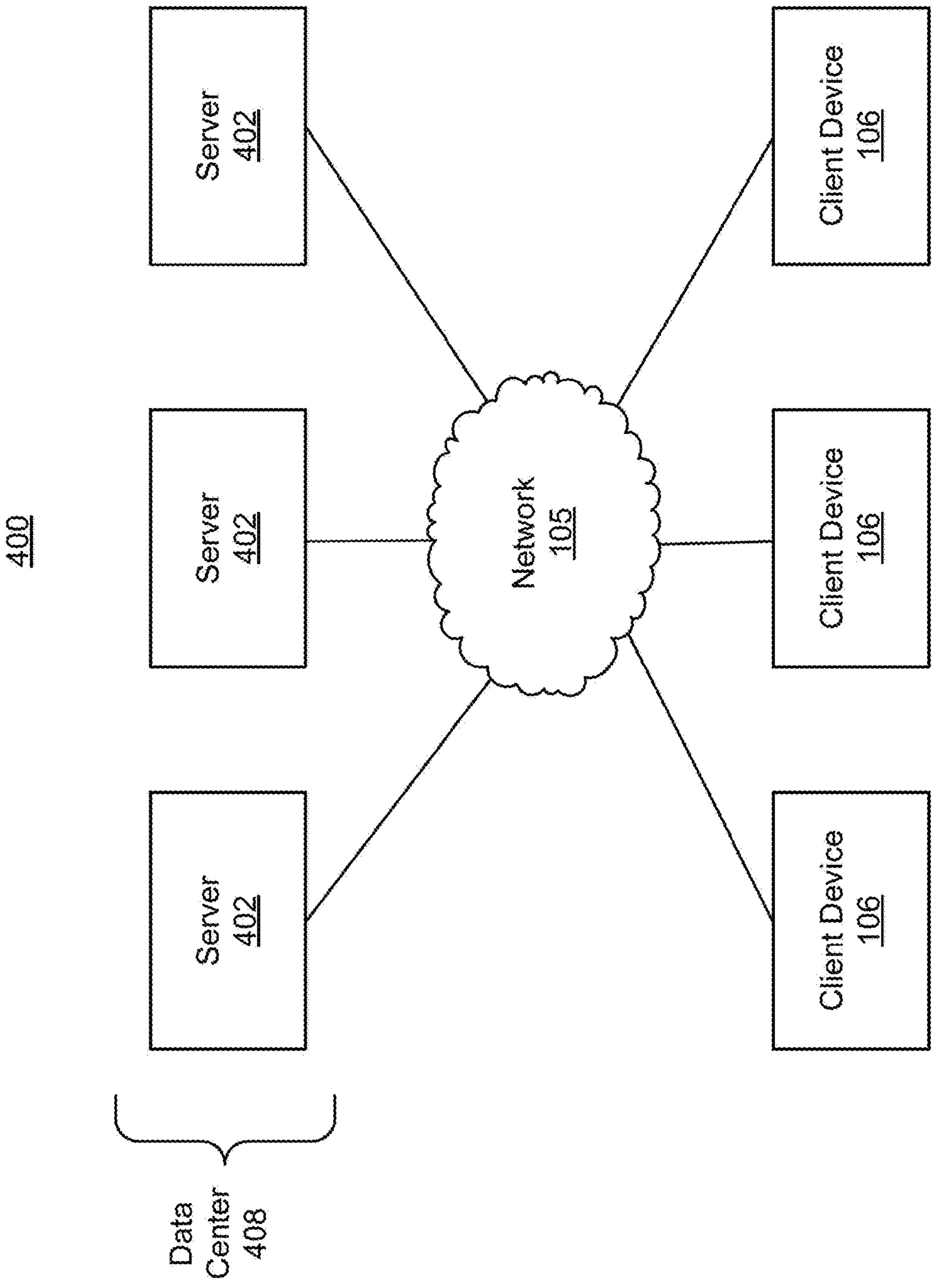
FIG. 4A is a block diagram depicting an implementation of a network environment including a client device in communication with a server device.

FIG. 4A depicts an example network environment that can be used in connection with the methods and systems described herein. In brief overview, the network environment 400 includes one or more client devices 106 (also generally referred to as clients, client node, client machines, client computers, client computing devices, endpoints, or endpoint nodes) in communication with one or more servers 402 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 4A shows a network 105 between the client devices 106 and the servers 402, the client devices 106 and the servers 402 can be on the same network 105. In embodiments, there are multiple networks 105 between the client devices 106 and the servers 402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 400 can include multiple, logically grouped servers 402. The logical group of servers can be referred to as a data center 408 (or server farm or machine farm). In embodiments, the servers 402 can be geographically dispersed. The data center 408 can be administered as a single entity or different entities. The data center 408 can include multiple data centers 408 that can be geographically dispersed. The servers 402 within each data center 408 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 408 do not need to be physically proximate to another server 402 in the same machine farm 408. Thus, the group of servers 402 logically grouped as a data center 408 can be interconnected using a network. Management of the data center 408 can be de-centralized. For example, one or more servers 402 can comprise components, subsystems and modules to support one or more management services for the data center 408.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
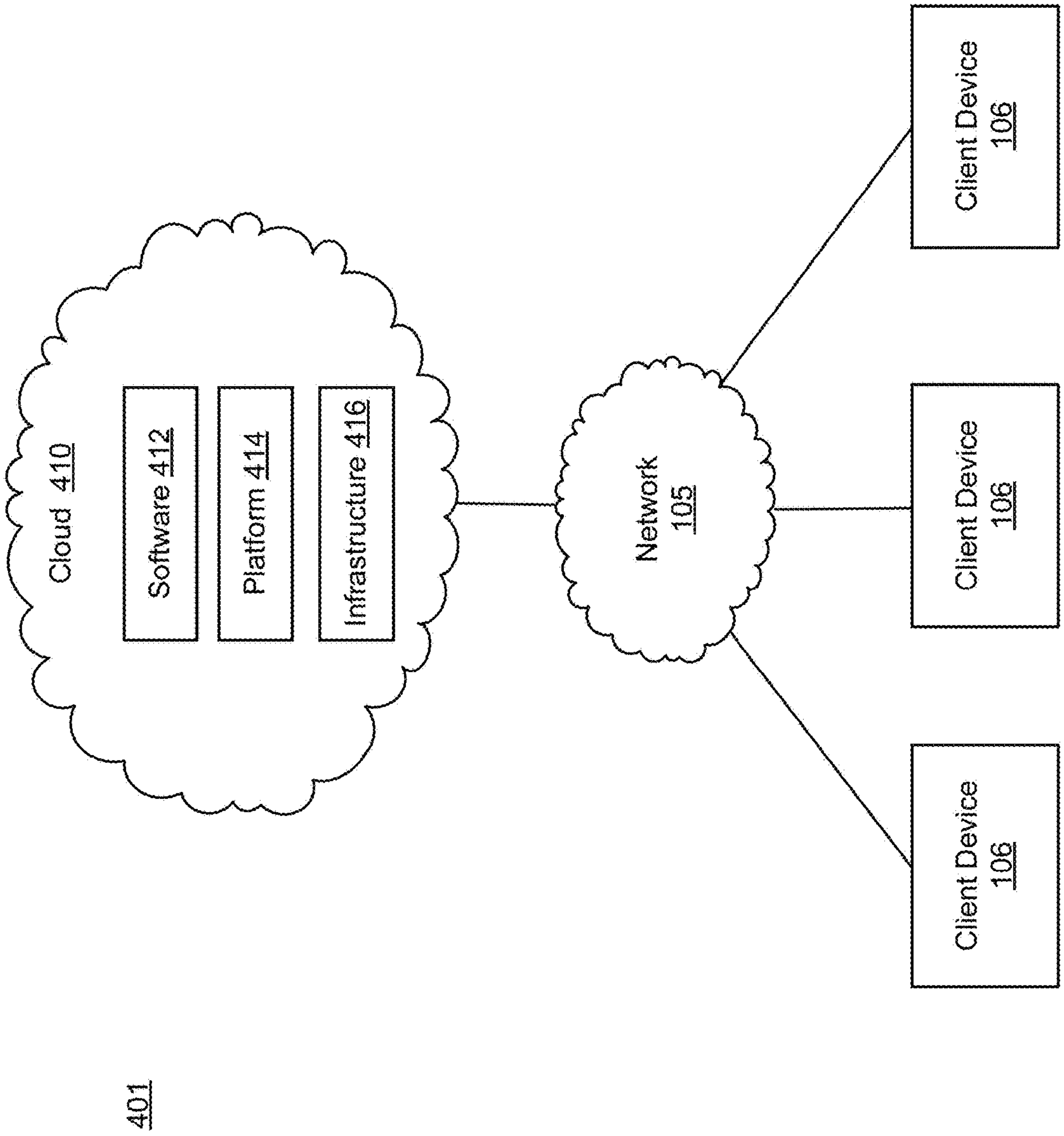
FIG. 4B is a block diagram depicting a cloud computing environment including a client device in communication with cloud service providers.

FIG. 4B illustrates an example cloud computing environment. A cloud computing environment 401 can provide client 104 with one or more resources provided by a network environment. The cloud computing environment 401 can include one or more client devices 106, in communication with the cloud 410 over one or more networks 105. Client devices 106 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 105 or servers 402 to retrieve operating system data for the client device. The cloud 410 can include back end platforms, e.g., servers 402, storage, server farms or data centers.

The cloud 410 can be public, private, or hybrid. Public clouds can include public servers 402 that are maintained by third parties to the client devices 106 or the owners of the clients. The servers 402 can be located off-site in remote geographical locations as disclosed above or otherwise. Public clouds can be connected to the servers 402 over a public network. Private clouds can include private servers 402 that are physically maintained by client devices 106 or owners of clients. Private clouds can be connected to the servers 402 over a private network 105. Hybrid clouds 408 can include both the private and public networks 105 and servers 402.

The cloud 410 can also include a cloud-based delivery, e.g. Software as a Service (SaaS) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 402 can be deployed as and/or executed on any type and form of computing device, e.g. a computer, network device or appliance capable of communicating on any type and form of network and performing the operations described herein.

Figure 4C:
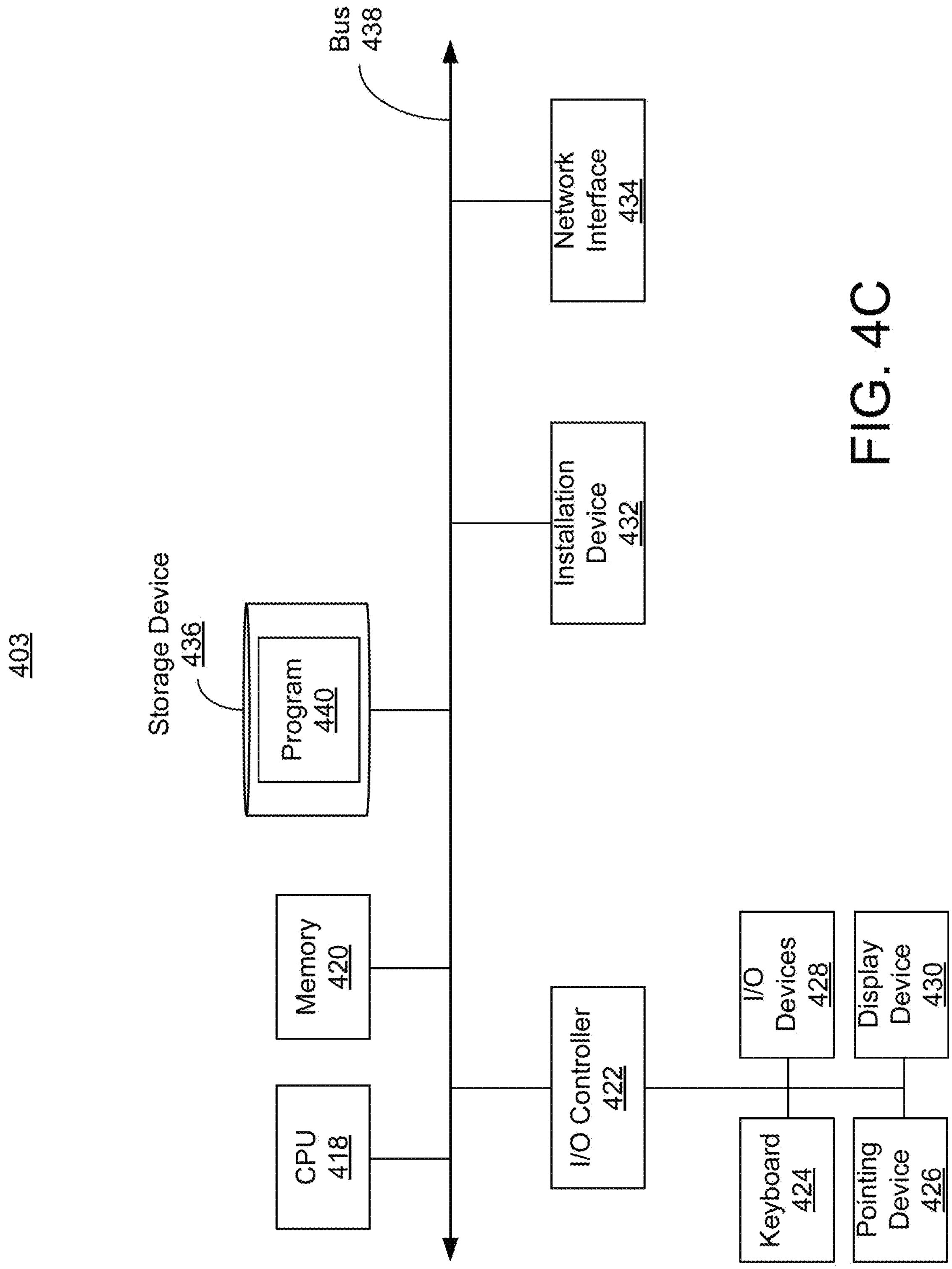
FIG. 4C is a block diagram depicting an implementation of a computing device that can be used in connection with the systems depicted in FIGS. 1, 6A and 6B, and the method depicted in FIG. 3.

FIG. 4C depicts block diagrams of a computing device 403 useful for practicing an embodiment of the client 106 or a server 402. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g. a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation of Mountain View, California. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, or 2. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 105. Some client devices 106 may not require a non-volatile storage device 436 and can be thin clients or zero client devices 106. Some storage devices 436 can be used as an installation device 432 and can be suitable for installing software and programs.

The computing device 403 can include a network interface 434 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 403 can communicate with other computing devices 403 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of one or more machines 106, 402 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

The description relates to a network monitoring system that may implement an anomaly detection method for time series data associated with communication sessions. A threshold-based method may utilize a manual trial and error process that may be highly time consumptive due to the manual nature of the method. It may also have difficulty in adapting to data pattern changes as readjustments of the thresholds for detecting anomalies may only occur after either too many or too few anomalies are detected. A statistic-based method may utilize large amounts of historical data to calculate a normal distribution of communication session data. This method may be difficult to implement due to the necessity of large amounts of historical data and may not be applicable to time series data due to the assumption of normal distribution, which is not usually accurate for seasonal data.

A computer implementing the systems and methods described herein may overcome the aforementioned technical deficiencies. For example, the computer implementing the techniques described herein may provide an automated and scalable system for detecting anomalies in large (e.g., unlimited based on computational power) quantities of time series data. The techniques may include the computer operating to select a machine learning model for generating forecast data. To do so, the computer may generate clusters of sets of time series data by applying one or more clustering algorithms. The computer may operate to evaluate different machine learning models for each of the clusters using a center of the time series data of each cluster. The computer may then select a respective machine learning model for each cluster based on an output that satisfies an accuracy threshold.

At least one aspect of a technical solution to the aforementioned problem is directed to a method. The method may comprise obtaining, by a processor, a plurality of sets of time series data; generating, by the processor, a cluster of two or more of the plurality of sets of time series data based on a similarity between each of the two or more sets of time series data; determining, by the processor, a first set of time series data as a center of the cluster; executing, by the processor using the first set of time series data as input, a first machine learning model to generate a first time series output; and responsive to determining the first time series output of the first machine learning model satisfies a threshold, executing, by the processor, the first machine learning model using a second set of time series data as input to generate a second time series output.

At least one aspect of this technical solution is directed to a system. The system may comprise a processor. The processor may obtain a plurality of sets of time series data; generate a cluster of two or more of the plurality of sets of time series data based on a similarity between each of the two or more sets of time series data; determine a first set of time series data as a center of the cluster; execute, using the first set of time series data as input, a first machine learning model to generate a first time series output; and execute the first machine learning model using a second set of time series data as input to generate a second time series output based on determining the first time series output of the first machine learning model satisfies a threshold.

At least one aspect of this technical solution is directed to a non-transitory computer-readable storage medium storing executable instructions that, when executed by a processor, cause the processor to obtain a plurality of sets of time series data; generate a cluster of two or more of the plurality of sets of time series data based on a similarity between each of the two or more sets of time series data; determine a first set of time series data as a center of the cluster; execute, using the first set of time series data as input, a first machine learning model to generate a first time series output; and execute the first machine learning model using a second set of time series data as input to generate a second time series output based on determining the first time series output of the first machine learning model satisfies a threshold.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the communication session analyzer 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

obtaining, by a network monitoring processor, a plurality of sets of time series data from a plurality of communication sessions between client devices and service providers via a monitored communication network;

generating, by the processor, a cluster of two or more of the plurality of sets of time series data based on a similarity between each of the two or more sets of time series data, wherein generating the cluster comprises automatically applying a first clustering algorithm to the plurality of sets of time series data, calculating a similarity value for the cluster using a silhouette coefficient, and, responsive to the similarity value being below a threshold, incrementing a quantity of clusters and reapplying the clustering algorithm until the similarity value satisfies the threshold or a maximum quantity of clusters is reached, or alternatively resetting the quantity of clusters and applying a second, different clustering algorithm;

determining, by the processor, a first set of time series data as a center of the cluster by computing, for each set, a distance to each other set of the cluster and selecting the set having a lowest aggregate distance to the other sets;

executing, by the processor using the first set of time series data as input, a first machine learning model to generate a first time series output comprising forecast values for a future period of the time series data;

responsive to determining the first time series output of the first machine learning model satisfies a variance threshold, executing, by the processor, the first machine learning model using a second set of time series data as input to generate a second time series output and calculating anomaly detection thresholds comprising an upper bound and a lower bound for the second time series output, wherein the bounds are used automatically by the processor to identify anomalies in subsequent observed time series data originating from the monitored communication network;

wherein the processor trains and evaluates a plurality of machine learning models sequentially in an order based on model training efficiency, trains each machine learning model of the plurality of machine learning models immediately prior to evaluating the machine learning model, and skips training and evaluating remaining less efficient machine learning models of the plurality of machine learning models responsive to determining the first time series output of the first machine learning model satisfies the variance threshold, thereby reducing processing requirements and training time;

wherein the anomalies comprise network performance anomalies including at least one of dropped calls, bandwidth degradation, signal quality degradation, or handover failures in the communication sessions; and responsive to determining an average variance score across time series data associated with a network performance metric falls below the variance threshold for a consecutive quantity of times, reevaluating and reselecting a different machine learning model for the network performance metric, thereby adapting machine learning model selection to data pattern changes in the time series data over time.

2. The method of claim 1, further comprising:

grouping, by the processor, each portion of the plurality of sets of time series data from the plurality of communication sessions associated with a respective network performance metric into a quantity of clusters.

3. The method of claim 1, further comprising:

prior to determining the first time series output satisfies the variance threshold, executing, by the processor using the first set of time series data as input, one or more other machine learning models of a plurality of machine learning models to generate respective time series outputs comprising respective forecast values for respective future periods of the time series data; and determining the respective time series outputs do not satisfy the variance threshold.

4. The method of claim 3, wherein the one or more other machine learning models and the first machine learning model are ordered in a list based on a model training efficiency metric.

5. The method of claim 1, further comprising:

responsive to determining the second time series output of the first machine learning model does not satisfy the variance threshold, executing, by the processor using the second set of time series data as input, a second machine learning model to generate a third time series output comprising additional forecast values for an additional future period of the time series data.

6. The method of claim 1, wherein executing the first machine learning model further comprises automatically tuning one or more hyper-parameters associated with the first machine learning model to determine a set of optimal parameter values.

7. A system, comprising:

a processor of a network monitoring system, coupled to memory, to:

obtain a plurality of sets of time series data from a plurality of communication sessions between client devices and service providers via a monitored communication network;

generate a cluster of two or more of the plurality of sets of time series data based on a similarity between each of the two or more sets of time series data, wherein to generate the cluster the processor automatically applies a first clustering algorithm to the plurality of sets of time series data, calculates a similarity value for the cluster using a silhouette coefficient, and, responsive to the similarity value being below a threshold, increments a quantity of clusters and reapplies the clustering algorithm until the similarity value satisfies the threshold or a maximum quantity of clusters is reached, or alternatively resets the quantity of clusters and applies a second, different clustering algorithm;

determine a first set of time series data as a center of the cluster by computing, for each set, a distance to each other set of the cluster and selecting the set having a lowest aggregate distance to the other sets;

execute, using the first set of time series data as input, a first machine learning model to generate a first time series output comprising forecast values for a future period of the time series data;

execute the first machine learning model using a second set of time series data as input to generate a second time series output and calculate anomaly detection thresholds comprising an upper bound and a lower bound for the second time series output based on determining the first time series output of the first machine learning model satisfies a variance threshold, wherein the bounds are used automatically by the processor to identify anomalies in subsequent observed time series data originating from the monitored communication network;

wherein the processor trains and evaluates a plurality of machine learning models sequentially in an order based on model training efficiency, trains each machine learning model of the plurality of machine learning models immediately prior to evaluating the machine learning model, and skips training and evaluating remaining less efficient machine learning models of the plurality of machine learning models responsive to determining the first time series output of the first machine learning model satisfies the variance threshold, thereby reducing processing requirements and training time;

wherein the anomalies comprise network performance anomalies including at least one of dropped calls, bandwidth degradation, signal quality degradation, or handover failures in the communication sessions; and responsive to determining an average variance score across time series data associated with a network performance metric falls below the variance threshold for a consecutive quantity of times, reevaluate and reselect a different machine learning model for the network performance metric, thereby adapting machine learning model selection to data pattern changes in the time series data over time.

8. The system of claim 7, wherein the processor further: groups each portion of the plurality of sets of time series data from the plurality of communication sessions associated with a respective network performance metric into a quantity of clusters.

9. The system of claim 7, wherein the processor further: prior to determining the first time series output satisfies the variance threshold, executes, using the first set of time series data as input, one or more other machine learning models of a plurality of machine learning models to generate respective time series outputs comprising respective forecast values for respective future periods of the time series data; and determines the respective time series outputs do not satisfy the variance threshold.

10. The system of claim 7, wherein the processor further: responsive to determining the second time series output of the first machine learning model does not satisfy the variance threshold, executes, using the second set of time series data as input, a second machine learning model to generate a third time series output comprising additional forecast values for an additional future period of the time series data.

11. The system of claim 7, wherein to execute the first machine learning model the processor further automatically tunes one or more hyper-parameters associated with the first machine learning model to determine a set of optimal parameter values.

12. A non-transitory computer readable storage medium comprising instructions stored thereon that, when executed by a processor of a network monitoring system, cause the processor to:

obtain a plurality of sets of time series data from a plurality of communication sessions between client devices and service providers via a monitored communication network;

generate a cluster of two or more of the plurality of sets of time series data based on a similarity between each of the two or more sets of time series data, wherein the instructions to generate the cluster cause the processor to automatically apply a first clustering algorithm to the plurality of sets of time series data, calculate a similarity value for the cluster using a silhouette coefficient, and, responsive to the similarity value being below a threshold, increment a quantity of clusters and reapply the clustering algorithm until the similarity value satisfies the threshold or a maximum quantity of clusters is reached, or alternatively reset the quantity of clusters and apply a second, different clustering algorithm;

determine a first set of time series data as a center of the cluster by computing, for each set, a distance to each other set of the cluster and selecting the set having a lowest aggregate distance to the other sets;

execute, using the first set of time series data as input, a first machine learning model to generate a first time series output comprising forecast values for a future period of the time series data;

execute the first machine learning model using a second set of time series data as input to generate a second time series output and calculate anomaly detection thresholds comprising an upper bound and a lower bound for the second time series output based on determining the first time series output of the first machine learning model satisfies a variance threshold, wherein the bounds are used automatically by the processor to identify anomalies in subsequent observed time series data originating from the monitored communication network;

wherein the instructions further cause the processor to train and evaluate a plurality of machine learning models sequentially in an order based on model training efficiency, train each machine learning model of the plurality of machine learning models immediately prior to evaluating the machine learning model, and skip training and evaluating remaining less efficient machine learning models of the plurality of machine learning models responsive to determining the first time series output of the first machine learning model satisfies the variance threshold, thereby reducing processing requirements and training time;

wherein the anomalies comprise network performance anomalies including at least one of dropped calls, bandwidth degradation, signal quality degradation, or handover failures in the communication sessions; and responsive to determining an average variance score across time series data associated with a network performance metric falls below the variance threshold for a consecutive quantity of times, cause the processor to reevaluate and reselect a different machine learning model for the network performance metric, thereby adapting machine learning model selection to data pattern changes in the time series data over time.

13. The medium of claim 12, comprising instructions stored thereon that, when executed by the processor, cause the processor to:

prior to determining the first time series output satisfies the variance threshold, execute, using the first set of time series data as input, one or more other machine learning models of a plurality of machine learning models to generate respective time series outputs comprising respective forecast values for respective future periods of the time series data; and determine the respective time series outputs do not satisfy the variance threshold.

* * * * *